United States Patent [19]
Regan et al.

[11] 4,210,693
[45] * Jul. 1, 1980

[54] REGISTER EMBOSS AND METHOD

[75] Inventors: Ernest E. Regan, Fort Lauderdale; Thomas J. McCann, Hollywood, both of Fla.

[73] Assignee: Dowdflor Corporation, Miami, Fla.

[*] Notice: The portion of the term of this patent subsequent to Jul. 11, 1995, has been disclaimed.

[21] Appl. No.: 862,627

[22] Filed: Dec. 20, 1977

[51] Int. Cl.² .................. B32B 3/00; B05D 3/06
[52] U.S. Cl. .................. 428/152; 427/44; 427/55; 427/56.1; 427/373; 427/412.1; 427/412.4; 428/156; 428/172; 428/161; 428/162; 428/282; 428/315; 428/320
[58] Field of Search .......... 428/156, 282, 159–161, 428/310, 315, 331, 334, 152, 162, 320; 427/44, 54, 55, 56, 373, 398 D, 407 R; 156/78, 79

[56] References Cited

U.S. PATENT DOCUMENTS

| | | | |
|---|---|---|---|
| 3,239,365 | 3/1966 | Petry | 156/78 |
| 3,293,094 | 12/1966 | Nairn et al. | 428/159 |
| 3,399,106 | 8/1968 | Palmer et al. | 156/78 |
| 3,453,171 | 7/1969 | Crowley | 428/310 |
| 3,916,393 | 11/1975 | Hahn | 427/54 |
| 3,924,023 | 12/1975 | Boranian et al. | 427/54 |
| 3,984,606 | 10/1976 | Morgan | 427/54 |
| 4,100,318 | 7/1978 | McCann et al. | 428/159 |

*Primary Examiner*—Paul Thibodeau
*Attorney, Agent, or Firm*—Jack E. Dominik

[57] ABSTRACT

The present disclosure relates to decorative flexible sheet goods and a method for making the same, such as sheet vinyl floor and wall coverings, wherein a crinkle finish is created on a decorative pattern on a flexible substrate in varying thicknesses and also in register with said decorative pattern. The method is accomplished by means of printing an actinic radiation curable coating which is essentially solvent-free and comprises at least one organic compound having at least two photopolymerizable ethylenically unsaturated groups per molecule and capable of curing upon exposure to actinic radiation. The actinic radiation cured registered coating serves the novel purpose of creating the desired relief to the pattern in register, and also forms a durable wear layer with superior stain and wear characteristics as well as gloss retention properties.

6 Claims, 3 Drawing Figures

REGISTER EMBOSS AND METHOD

FIELD OF INVENTION

The present invention relates to the subject matter of decorative flexible sheet goods such as sheet vinyl floor and wall coverings wherein an embossed pattern is created in register with a printed design.

SUMMARY OF PRIOR ART

In the production of commercially acceptable sheet goods of resinous compositions such as floor, wall and table coverings, book covers, decorative containers, coated fabrics for use as upholstery, clothing, automobile interiors, coated metals, glass and woods, and the like where an emboss pattern is desirable, it has been previously accomplished through chemical alteration of the resinous foam structure (chemical embossing) or by mechanical crushing of the resinous foam cells in certain selected areas of the sheet (mechanical embossing). Another method for creation of patterns with embossed surfaces on resinous compositions is accomplished by rotary screen printing of foamable plastisols to create the desired relief.

Designs have been printed on the surface of the resinous composition sheets, which are, in most cases, protected with a clear transparent topcoat with satisfactory wearing characteristics.

Embossing of resinous composition sheets which can be accomplished by mechanical means are disclosed in U.S. Pat. Nos. 3,655,312 and 3,932,245 to Erb et al. In the disclosure, a foamable resinous layer is coated over an asbestos substrate, heated to gell the foamable resinous layer, afterwhich, a color pattern is applied to the upper surface of the gelled foamable resinous composition. A layer of transparent resinous composition is then coated over the upper surface of the color pattern and the said layers are heated at sufficient temperatures to foam the foamable resinous composition and fuse the transparent resinous composition. While the sheet is hot, it is drawn through a nip between the backing roll contacting the undersurface of said sheet material and an embossing roll contacting the upper surface of the sheet material. The backing and embossing rolls are driven by contact with said sheet material, and the embossing is affected at constant roll pressure to thereby control the pressure. The rotational speed of said embossing roll is controlled to apply a relief pattern in registry with the areas of the said color pattern.

Chemical embossing techniques are alternatives to mechanical embossing. A chemical technique is disclosed in U.S. Pat. Nos. 3,293,094 and 3,293,108 to Nairn et al. In the disclosure, a resinous cellular layer is produced by coating a foamable resinous composition on an asbestos substrate, heating to gel the foamable resinous composition, afterwhich a color pattern is applied to the uppersurface of the gelled foamable resinous composition. An inhibitor, which alters the decomposition temperature of the foamable resinous composition, is mixed with one or more of the inks utilized in producing the color pattern. A clear transparent resinous topcoat is coated over the printed surface and the said layers are heated at sufficient temperatures to foam the foamable resinous composition and fuse the transparent resinous composition. In the areas where inhibitor was applied to the foamable resinous composition, there is little or no foaming resulting in depressed areas and where there was no contact of inhibitor there is foaming or raised areas.

Another embossing procedure applicable to foamable compositions is disclosed in U.S. Pat. No. 2,920,977 to Adams. In the disclosure is the method comprising printing a plurality of polyvinyl chloride compositions in a design on a supporting sheet to completely cover the sheet. The polyvinyl chloride compositions can be a variation of foamable and non-foamable compositions; the foamable compositions can contain varying amounts and types of blowing agents and can be printed at different film thicknesses to create the desired emboss effect. While the above-mentioned conventional techniques for embossing are being employed, there are certain inherent drawbacks to each of the methods. Mechanical embossing, it has been found, has not been fully satisfactory or practical to produce a relief pattern in perfect registration with a printed pattern on a foamed material by using emboss rolls. Because the foamed material is yielding and compressible, it is very difficult to maintain accurate registration between the printed pattern and the embossing roll. Also, mechanical embossing of foamed material results from the crushing of foam cells. The gases which are displaced from the crushed foam cells must be free to dissipate laterally. If the gas is restricted from lateral dissipation, it will create blistering in the product.

Inherent drawbacks associated with chemical embossing techniques include the fact that the chemical inhibitor being utilized must be carefully controlled in the chemical ink formulation to result in the desired texturing effects. Also, in products that have relatively thick foam layers and/or thick wear layers, it has been found difficult to achieve deep embossing.

Both chemical and mechanical embossing are accomplished through a partial or total elimination of the foamable underbody in certain selected areas to create the desired relief or texture. This elimination of the foamable layer in certain areas of the sheet results in less cushion and resilience in the unfoamed areas.

Printing of foamable plastisols requires the use of rather thick laydowns which is accomplished through flatbed or rotary screen printing. The employment of such printing methods does not allow for intricate pattern design which can be accomplished by rotogravure printing.

U.S. Pat. No. 4,100,318 issued July 11, 1978 teaches the application of an actinic radiation curable coating to a cushioned vinyl product comprising an expanded vinyl foam and clear vinyl overlay atop a carrier where a decorative pattern is usually present. The coating is fully reacted upon exposure to actinic radiation resulting in a tack-free surface with improved stain resistance, gloss, scratch and abrasion resistance. U.S. patent application Ser. No. 862,641 filed Dec. 20, 1977 for crinkle embossing on flexible vinyl substrates discloses a means of applying an actinic radiation curable coating over a flexible vinyl substrate which, when cured and exposed to elevated temperatures, develops a uniform surface crinkle.

SUMMARY OF THE INVENTION

The present invention provides a process for embossing on a flexible sheet goods substrate in register with the printed design by means of printing an actinic radiation curable coating which is essentially solvent-free and comprises at least one organic compound having at least two photo-polymerizable ethylenically unsaturated groups per molecule and which is capable of curing on exposure to an actinic radiation source. The printing of the actinic radiation curable coating can be accomplished in line as part of the normal printing sequence by utilizing the last one or two printing stations for applying the actinic radiation curable coating in register with the colored decorative design. The product has surface relief, design register, and superior wear and stain resistant properties.

In view of the foregoing, it is a principal object of the present invention to produce a registered, crinkle surface finish by exposing the actinic radiation printed flexible sheet goods to sufficient temperatures to expand the foamable layer and fuse the transparent overlay, whereby, because of the differential in the physical properties of the actinic radiation curable coating (lower elongation) and the flexible substrate (higher elongation), a permanent and reproducible distortion takes place.

It is a further object of the present invention to create an emboss definition resulting in no intended alteration in foam quality and, hence, no intended loss in resilience of the finished product as happens with mechanically or chemically embossed materials.

It is a further object of the invention to create two-tone gloss effects by, for instance, printing a low gloss actinic radiation coating to simulate a grouting while printing a high gloss in the land areas to simulate a high gloss tile. It is still another object of the invention to apply pigmented actinic radiation curable coatings for further desired design effects.

Still another object of the present invention is through the use of varying engraving depths and corresponding coating thicknesses to create many different designs.

It is still another principal object of the present invention to utilize the actinic radiation curable coating not only for emboss definition, but also, as the protective topcoat with superior wear and stain characteristics as well as gloss retention properties, which is accomplished in line and does away with making an extra pass on the equipment which is both time consuming and involves further expense.

DESCRIPTION OF DRAWINGS

Further objects and advantages of the present invention will become apparent as the following description of the illustrative drawings proceed, along with the description of the product and method in which.

DESCRIPTION OF PRODUCT AND METHOD

Method

Figure 1:
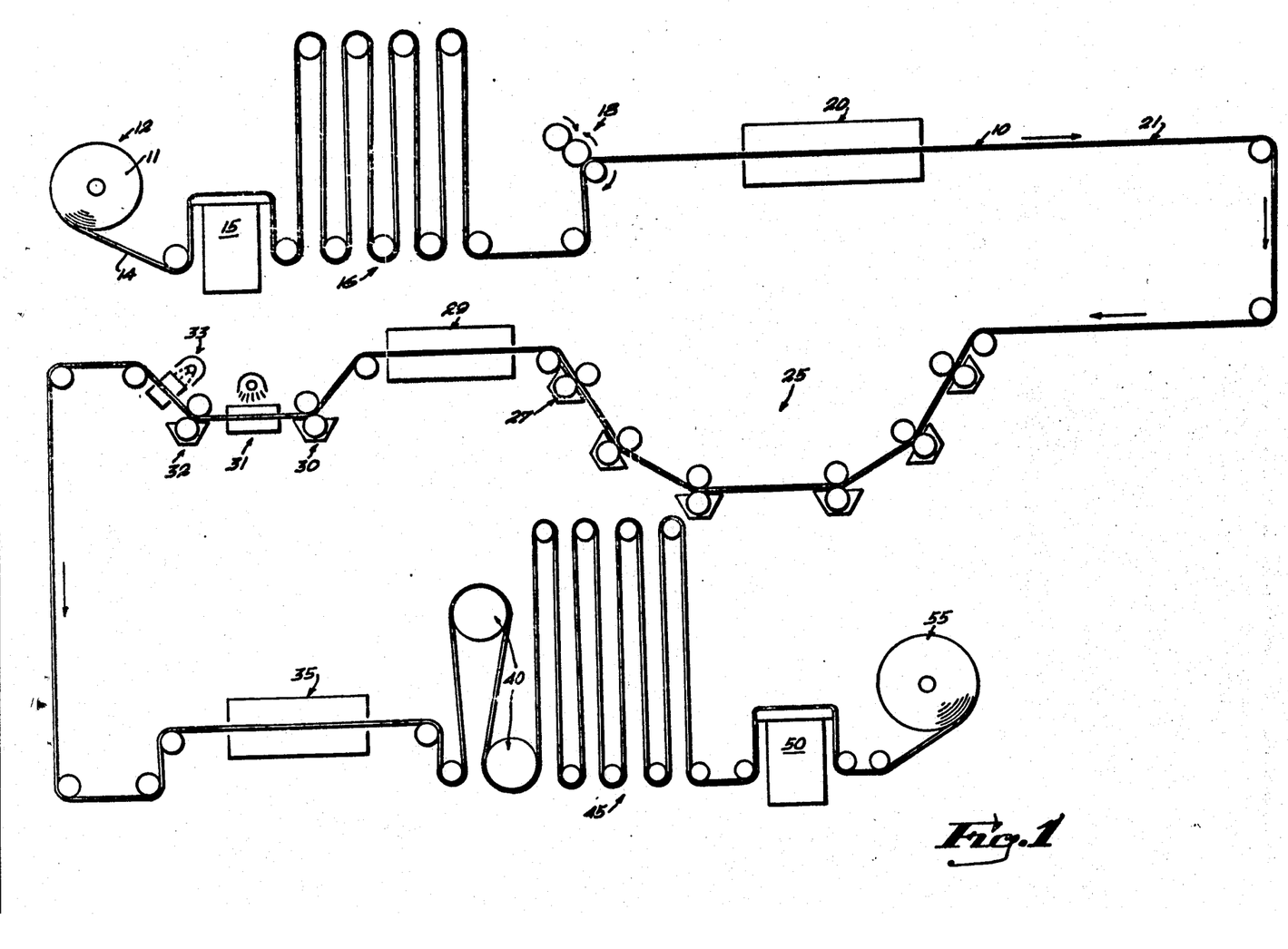
FIG. 1 shows a preferred flow-sheet for the manufacture of the subject product.

For a better understanding of the product, the method or systems in which it is made will first be described as it is shown in FIG. 1 of the drawings. There it will be seen that the flow system 10 contemplates a felt roll 11 which is secured to a felt let off assembly 12. The felt sheet 14 then proceeds over a splicing table 15, where different rolls of felt 11 may be exchanged, accommodated by the accumulator 16. After passing the accumulator 16, the felt is passed through a reverse roll foam coating assembly 18 where the initial foamable vinyl is applied. Thereafter, the coated felt is passed into the gel oven 20, and the coating is set. Subsequently, the foam coat 17 is set sufficiently that the same can be passed through the gravure printer 25. The specific gravure printer shown is a five station unit. The sixth station is a rotary screen 27 where a transparent vinyl overlay 28 is applied. The sheet is passed through an infrared oven 29 to gel the transparent overlay. The sheet is then passed through a two-station rotary screen printer 30 and 32 where the actinic radiation curable coatings 19 are applied, and set upon exposure to actinic radiation 31 and 33, in register with the colored pattern.

The web is then passed through a fusion and expansion oven 35 and upon exiting the oven, the foamable coat has expanded to a cellular foam 17 and the clear vinyl overlay 27 is completely fused and an emboss definition conforming to the applied actinic radiation coatings 19 has been created in register with the previously printed decoration 25. The web is then passed over a cooling drum assembly 40 afterwhich it passes through the accumulator 45, over a splicing table 50 and onto the finished rolls 55 which are subsequently packaged and stored for shipment for ultimate use by the customer as floor and wall coverings and the like.

Product

The product desirably is a flexible sheet goods wherein an emboss pattern is created in register with the printed design by means of printing an actinic radiation curable coating which is essentially solvent-free and comprises at least one organic compound having at least two photopolymerizable ethylenically unsaturated groups per molecule and capable of curing upon exposure to actinic radiation. The actinic radiation cured coating serves the novel purpose of creating the desired relief to the pattern in register and also forms a durable wearlayer with superior stain and wear characteristics as well as gloss retention properties.

The flexible sheet goods substrate may be a noncellular material such as a decorative vinyl laminate. The flexible sheet goods substrate may be a foamed material with a solid skin or topcoat such as is conventionally manufactured for floor and wall coverings.

While some of the desirous applications for register embossing have been noted, it is understood that the process of the invention is widely applicable to many other areas where a registered emboss is desired on a flexible substrate. In a preferred embodiment of the invention a registered emboss is created on conventional cushioned sheet vinyl floor covering.

In accordance with known practice, a foamable resinous polymer composition is applied to a base at the desired thickness and then heated to gel the composition to give a presentable printing surface. After printing, a clear vinyl overlay is applied and the composite is then heated under controlled conditions of time and temperature to fuse the vinyl layers and expand the foam.

The prior art resinous composition and methods are well taught in U.S. Pat. Nos. 3,293,094 and 3,293,108; however, a brief discussion of the ingredients and how they are employed in producing a finished cushioned vinyl sheet goods article will serve as good background information for the present invention.

The resinous compositions useful to form the product are preferably vinyl plastisol dispersions made up of appropriate amounts of polyvinyl chloride resins, plasticizers, blowing agents, pigments, activators, heat stabilizers, light stabilizers, and viscosity depressants.

Resins adaptable for use in formulating vinyl plastisols are commonly referred to as dispersion grade resins. Such resins are available having particle sizes of from about 0.2 to about 2 microns. Dispersion grade resins are usually of higher molecular weight than calendar grade resins and have particle surfaces of a hard, horny nature. The preferred molecular weight for the foam grade resin is Relative Viscosity of 2.05. The preferred molecular weight for the clear vinyl overlay is Relative Viscosity of 2.65 and higher.

Plasticizer selection is important in determining the physical properties of the coating and its rheological characteristics. Esters of straight and branched long chain aliphatic and aromatic alcohols with aliphatic and aromatic acids are utilized depending on properties necessary in the fused form. Esters of aliphatic alcohols and acids impart low viscosity and good viscosity stability. Esters of the aromatic type impart good foaming characteristics to a plastisol. The plasticizer or blend of plasticizers is chosen to yield a composition of the desired viscosity and/or foaming characteristics. Blowing agents are well known in the art and the particular blowing agent selected usually depends on cost, resin, and density required. Blowing agents are complex organic compounds which, when heated, decompose to yield an inert gas and have residues which are compatible with the resin. Preferred blowing agents have the property of decomposition over a narrow temperature range which is particularly desirable to obtain a good foam structure. Typical types of blowing agents which are of significant interest to the invention are substituted nitroso compounds.

Substituted hydrazides (RSO$_2$NHNHR'), substituted azo compounds (R—N=N—R'), acid azides (R—CON$_3$), guanyl compounds and the like wherein R and R' are hydrogen or hydrocarbon groups usually containing from one to ten groups.

The blowing agents which have found the most widespread use are those compounds having the N—N or —N=N— linkages which decompose at elevated temperatures to yield an inert gas high in nitrogen. These compounds have the general formula and wherein, a, b, c and d are hydrocarbon groups preferably containing up to 10 carbon atoms, or hydrogen with at least one of the groups being a hydrocarbon group. Many of these hydrocarbon groups contain additional nitrogen groups such as hydrazide, amido, nitro, nitrile, and the like.

Blowing agents for use in the invention are decomposed an effective amount at a temperature below the decomposition temperature of the resin used. The preferred blowing agents are those that decompose above the elastomeric point of the resin composition since this enables at least partial gelling of the foamable coating so that a design can readily be printed on its surface. With the preferred vinyl polymers, a blowing agent decomposing between about 300° F. and 450° F. can be used. The degree of foaming of a typical plastisol formulation using different concentrations of blowing agents is shown in Table I.

TABLE I

| Parts by Weight of Azodicarbonamide per 100 parts by Weight Resin | Ratio of Foam Thickness to Original Thickness | Density, Pounds per Cubic Feet |
|---|---|---|
| 0.0 | 1/1 | 80 |
| 0.1 | 1.33/1 | 60 |
| 0.5 | 2/1 | 40 |
| 1.0 | 3/1 | 27 |
| 2.0 | 4.5/1 | 17.5 |
| 3.0 | 6.5/1 | 12.3 |
| 5.0 | 9.3/1 | 8.6 |

It has been found that density of from 15 to 50 pounds per cubic foot produces the most useful products. The thickness of the foam layer will depend in large measure on the final product desired. As a general rule, foam thicknesses of a 0.005 to about 0.150 inch are particularly useful.

The coating compositions may contain pigments in accordance with the particular color desired. Any of the organic and inorganic pigments well known in the art for pigmenting compositions can be used. Normally, from about 0.5 to about 5 parts pigments per 100 parts resin are used.

It is common practice to add accelerators or catalysts to the compositions to accelerate the decomposition of the blowing agents, reduce the decomposition temperature and/or narrow the decomposition range. Typical accelerators are various metal salts such as dibasic lead phosphite, dibasic lead stearate, dibasic lead phthalate and similar lead salts, zinc salts such as zinc laurate, zinc oxide, zinc stearate, zinc carbonate, zinc salt of mercaptobenzothiazole, zinc octoate, zinc naphtholate, zinc dust, and cadmium octoate. The agents can also serve as stabilizers for the composition. Minor amounts of stabilizers are usually incorporated in the coating composition to reduce the affects of degradation by light and heat. Suitable light stabilizers include resorcinol disalicylate, resorcinol dibenzoate, phenyl phthalate, phenyl benzoate, o-tolyl benzoate, eugenol, guaicol, o-nitrophenol, o-nitroaniline, triethylene glycol salicylate, and organic phosphates and other complexes of such metals as barium, cadmium, strontium, lead, tin and the like. Suitable heat stabilizers include sulfides and sulfites of aluminum, silver, calcium, cadmium, magnesium, cerium, sodium, strontium, and the like glycerine, leucine, alanine, o- and p-aminobenzoic and sulfanilic acids, hexamethylene tetramine, weak acid radicals including oleates, ricinoleates, abietates, salicylates and the like.

If volatile diluents are used to reduce the viscosity of the coating composition, care must be taken that they are essentially removed prior to fusion and foaming. This removal can be accomplished by heating the composition at a temperature substantially below the fusion temperature and minimum decomposition temperature of the foaming agent for sufficient time to remove the volatile material.

The backing, carrier, or substrate utilized for the resinous coatings is usually a flexible sheet. Suitable flexible backing sheets include those formed of flexible resinous composition as well as sheets of woven fabric and impregnated felted fibers. It has been found that felted cellulose or asbestos fibrous sheets impregnated with a water resistant and strengthening saturant yield particularly desirable backing sheets for the production of products in accordance with the invention. The particular impregnant or saturant chosen must not only be capable of imparting strength and water resistance to the sheet of felted fibers, but must also meet the requirements of high temperature stability. The impregnant should be essentially free of volatile components and not soften to such an extent as to exude from the sheet. In addition, the saturant should not be subject to appreciable detrimental chemical changes such as oxidation. Some resin impregnants which produce a felted sheet with excellent physical properties are not compatible with the coating compositions to be applied. This may result in poor adhesion of the coatings to the base. In such cases, it is desirable to size the surface of the impregnated felt sheet to which the foamable composition is to be applied with a thin coating of material which has good adhesion to both the felt impregnant and the foamable composition. Acrylic polymers have been found particularly effective in aiding adhesion without causing sticking of the sized surface to the rolls during the processing. Suitable resins for use as impregnants include vinyl resins and its copolymers, acrylic resins, polyethylene, polystyrene, butadiene-styrene copolymer, butadiene-acrylonitrile copolymer, natural rubber, polymerized chloroprene and the like. Thermosetting resins such as phenolic resins, polyesters, oleoresins, polyurethane resins and the like are suitable.

The following examples are given for purposes of illustration and wherever "PARTS" are designated, it is parts by weight, unless otherwise noted:

EXAMPLE I TYPICAL FOAMABLE PLASTISOL FORMULATION

| Ingredients | Parts |
| --- | --- |
| Polyvinyl Chloride (dispersion grade, specific viscosity 0.60) | 50 |
| Polyvinyl Chloride (dispersion grade, specific viscosity 0.40) | 50 |
| ButylBenzyl Phthalate | 40 |
| Di (2-ethylhexyl) Phthalate | 20 |
| Titanium Dioxide | 7 |
| Azodicarbonamide | 2.5 |
| Diabasic Lead Phosphite | 1.5 |
| V.M.&P. Naphtha (Boiling Range 190°-275° F.) | 5 |

EXAMPLE II TYPICAL CLEAR VINYL OVERCOAT PLASTISOL

| Ingredients | Parts |
| --- | --- |
| Polyvinyl Chloride (dispersion grade, specific viscosity 0.50) | 100 |
| Alkylaryl modified phthalate ester (plasticizer) | 38 |
| Epoxidized Tall Oil Ester (secondary plasticizer) | 5 |

| Ingredients | Parts |
| --- | --- |
| 2,2,4-trimethyl-1,3-pentanediol diisobutyrate | 7 |
| Stabilizer (Calcium/Zinc/Phosphite) | 3 |
| V.M.&P. Naphtha (Boiling Range 190° to 275° F.) | 5 |

Preferably the printing of the decorative design on the upper surface of the gelled foamable coating is accomplished by rotogravure, however any of the conventional printing techniques such as flat bed, rotary screen or silk screen can be employed.

Typical Ink Formulation

| Ingredients | Parts |
| --- | --- |
| Vinyl Chloride-Vinyl Acetate Copolymer | 12.5 |
| Pigments | 12.5 |
| Methyl Ethyl Ketone | 75.0 |

The invention is directed to the use of actinic radiation curing, preferably ultraviolet radiation, for the creation of an embossed surface on a flexible vinyl substrate in register with the color pattern by means of printing an actinic radiation curable coating which is fully reacted upon exposure to such radiation.

There are many irradiation techniques which can be employed to initiate curing and to promote cross linking of surface coatings. Electron beam radiation is an example of a very high energy irradiation technique which promotes extremely rapid polymerization. It is less desirable, however, for purposes of this invention unless used at low energy levels.

For purposes of this invention, ultraviolet radiation is the preferred source. Ultraviolet radiation induces a photochemical reaction which produces free radicals from the photoinitiators present in the photocurable formulation. These free radicals in turn cause polymerization of the monomers, reactive pre-polymers, and inert polymers present resulting in a cured film. Sources of ultraviolet radiation can be mercury vapor arc lamps, plasma arcs, pulsed xenon lamps and carbon arcs. Mercury vapor arc lamps are currently the most commonly used and include three types: low, medium and high pressures. High pressure mercury arc lamps are the most intense source of ultraviolet being ten times more powerful than the medium pressure mercury lamps, but they operate at very high temperatures, thus water cooling is generally required which may lead to instability of intensity. Also, because of their high operating temperatures, they only have a useful life of about 200 hours. The medium pressure mercury arc lamp will operate at a lower temperature than the high pressure mercury lamp and will have a useful lifetime of at least 1,000 hours. While the medium pressure mercury arc lamp operates at lower temperatures than high pressure lamps, temperatures of 800° C. are still attained and cooling must be accomplished efficiently. Air or water is generally used for cooling purposes. Low pressure mercury arc lamps operate at near room temperature and have a useful lifetime of 2,500 to 12,000 hours. They emit two levels of radiation centered at 254 nm and 185 nm, but intensity is too low. The medium pressure mercury arc lamps are the most commonly accepted because they offer much greater efficiency than low pressure mercury arc lamps and longer life than the high pressure mercury lamps. Not only do mercury arc lamps generate ultraviolet radiation, they also emit in the infrared and visible region. Infrared radiation will not initiate polymerization, but does assist in propagation once initiation has been achieved.

Efficiencies of up to 50% have been claimed for ultraviolet generation of medium pressure mercury arc lamps. A lamp which generates a high percentage of ultraviolet radiation will generate a proportionately lower amount of visible and infrared radiation and vice versa.

Lamps operating at a lower vapor pressure (in the medium range) require a higher amperage and generate a higher percentage of ultraviolet radiation. Lamps operating at a high vapor pressure (in the medium pressure range) require a high voltage and generate more infrared radiation; thus, the ultraviolet output in a selection of medium pressure mercury arc lamps will vary. The choice of lamps may well depend on the type of system to be cured.

Specific wavelengths of light most effective will vary depending upon the coating employed and the particular photosensitizer package employed. Generally speaking, wavelengths in the range of 2,500 to 4,000 angstroms are suitable.

The components of an ultraviolet curable formulation generally contain an unsaturated resin, a reactive monomer, a multifunctional monomer, and a photoinitiator. The multifunctional monomer serves a dual role as the crosslinking agent and as the reactive solvent. In most cases, the type of unsaturated resin will affect the properties of the ultraviolet coating more than either the reactive monomer or the multifunctional monomer.

The unsaturated resins are usually low molecular weight polymers or "oligomers" containing a functional group which participates in the polymerization process. Examples of such unsaturated resins are such compounds containing polar groups which are preferably urethanes. However, polyethers, polyesters, epoxies, amides and the like terminated by two or more photopolymerizable ethylenically unsaturated groups and which are preferably of the acrylic type can be employed.

The monofunctional monomers employed are important to the final film properties such as flexibility, adhesion, toughness and hardness. The monofunctional monomers lower the viscosity of the ultraviolet curable formulation. The monofunctional monomers are also extremly important to the cure rate of the system. For instance, acrylate monomers are approximately ten times faster than methacrylate monomers which, in turn, are more responsive than vinyl esters, vinyl ethers or styrenes.

Monomers that can be polymerized according to this invention have at least one polymerizable ethylenically unsaturated group of the structure

Of these monomers, the preferred are those containing at least one acrylyl group of the structure

Illustrative of which one can mention, acrylic acid, methyl acrylate, ethyl acrylate, butyl acrylate, hexyl acrylate, 2-ethylhexyl acrylate, butoxyethyl acrylate, dicyclopentenyl acrylate, isodecyl acrylate, 2-phenoxyethyl acrylate, glycidyl acrylate, 2-ethoxyethyl acrylate, 2-methoxyethyl acrylate, 2-(N,N-diethylamino) ethyl acrylate, trimethoxyallyloxymethyl acrylate, vinyl acrylate, 2-hydroxypropyl acrylate, 2-hydroxyethyl acrylate, (methylcarbamyl) ethyl acrylate. The acrylyl compounds are well known and the above listed are only illustrative; the majority of photocurable compounds containing an acrylyl group may be suitable for use.

In addition to acrylyl monomers, others are the methacrylyl monomers, nitriles, olefins, vinyl halides, vinyl esters, vinyl ketones, vinyl ethers and thioethers, and miscellaneous sulfur and nitrogen containing monomers. Other photocurable monomers are readily apparent to one skilled in the art of polymerization chemistry. The specific compounds mentioned are illustrative only and not all inclusive. Multifunctional monomers are added along with monofunctional monomers where it is desired to increase the crosslink density of the coating. The mutifunctional monomers are preferably of the acrylyl type such as neopentyl glycol diacrylate, pentaerythritol triacrylate, 1,6-hexanedioldiacrylate, trimethylolpropane triacrylate. The multifunctional acrylic monomers listed are for illustrative purposes only. As with the monofunctional monomers listed above any multifunctional monomers capable of curing on exposure to radiation are suitable.

The photoinitiator system is a vital part of the ultraviolet curable formulation. Photoinitiators are compounds which will absorb radiation and convert the absorbed energy to a reactive triplet state which is a free radical and thus extremely reactive. One type of photoinitiator system utilized is by that of hydrogen abstraction. The existence of the carbonyl group is mainly responsible for the special properties of this photoinitiator system. Situated on the oxygen atom of the carbonyl group is a lone pair of electrons occupying a nonbonding orbital and is an electronic transition which confers free radical properties on the carbonyl group. The photoactivated carbonyl group must ineract with another substance which can donate a hydrogen atom.

*PHOTOACTIVATED

Compounds which, in addition to the carbonyl group, contain other hetero atoms or groups which also have a lone pair of electrons associated with them seen to have a synergistic effect and the photo-activity of the carbonyl center is enhanced. Examples are:

Thioxanthone          Michlers Ketone

Another type of photo-initiator system undergoes heterolytic fission to break the carbon to carbon bond within the molecule as illustrated by the following:

Air inhibition or oxygen effect on ultraviolet curing will rapidly terminate the free radical polymerization. The reason for this is that oxygen is a radical in its group state, hence its high reactivity towards other radicals. The reaction of oxygen with initiator and growing polymer radicals produces peroxy radicals ($PO_2^*$) which undergo H—abstraction from a hydrogen donor thereby terminating the chain. The overall effect is the formation of short polymer chains resulting in a tacky surface with poor coating characteristics. The faster the propagation, the less important is reaction with oxygen. A very active coinitiator with benzophenone type photo-initiator is a very reactive hydrogen donor. Tertiary amines are very reactive hydrogen donors in combination with benzophenone. The "alpha" amino radical formed reacts with oxygen levels in the coating as well as at the immediate surface.

Illustrative of such photo-initiators are benzoin, benzil, and benzoin ethers; polycyclic aromatic ketones i.e., benzophenone and its derivatives. Amines used as photo-synergist in combination with polycyclic aromatic ketones give remarkable acceleration of cure rate. Certain halogenated compounds have been found to be very effective photo-initiators. Other photo-initiators worthy of mention are mercapto compounds, amine oxides and phosphine derivatives.

Photo-initiators are employed in amounts from about 0.5% to 20%; more commonly 1% to 5%. In selection of photo-initiator, those having high extinction coefficients at wavelengths which correspond to the emission band of the curing lamps, will be the most effective in promoting polymerization.

Illustrative of the type of photo-curable formulation in accordance with this invention:

EXAMPLE I

A photo-curable coating composition was produced having the following formulation in parts by weight:

| | |
|---|---|
| Acrylated Pluracol TP-340 (BASFWYANDOTTE POLYETHER AVERAGE MOL. WGT 300) | 65 |
| 1,6-Hexanediol Diacrylate | 20 |
| Isodecyl Acrylate | 10 |
| Benzoin Butyl Ether | 2.5 |

The acrylated polyether was the reaction product of (10 moles) ethyl acrylate and (1 mole) of Pluracol TP 340. Both 0.29 g phenothiazine and 0.14 nitrobenzene were added as thermal polymerization inhibitors. The reactants were heated to 103° C. pot temperature at which temperature the water/ethyl acrylate azeotrope was removed. Pot temperature was cooled to 50° C. and 14.5 g of DuPont Tyzor TPT organotitanate complex catalyst was added. The reaction was allowed to increase slowly to a maximum of 130° C. At this point, the reactants were vacuum stripped of excess ethyl acrylate. The pot residue was mixed well with 1 g water to destroy the catalyst and then filtered to remove the spent catalyst.

Curing of 2.5 mils of the coating composition was accomplished in a nitrogen atmosphere by exposing for no more than 2 seconds irradiation with a 200 watt/inch Hanovia medium pressure mercury vapor lamp.

EXAMPLE II

A photo-curable coating composition ws produced having the following formulation in parts by weight;

| | |
|---|---|
| Urethane Oligomer | 60 |
| Neopentyl Glycol Diacrylate | 15 |
| (Methyl Carbamyl) Ethyl Acrylate | 35 |
| Benzophenone | 2.5 |

The urethane oligomer was the reaction product at about 40° to 50° C. of one mole of poly (epsilon-caprolactone) having an average molecular weight of about 550 (which was produced by reacting epsilon—caprolactone using trimethylolpropane as the starter), 3 moles of isophorone diisocyanate and 3 moles of 2-hydroxyethyl acrylate. 2.0 mils cured to a dry film upon exposure to 2.2 kilowatts medium pressure mercury lamps in a nitrogen atmosphere.

EXAMPLE III

A photo-curable coating composition was produced having the following formulation in parts by weight.

| | |
|---|---|
| Methacrylated Polyester | 50 |
| Pentaerythritol Triacrylate | 25 |
| Trimethylolpropane Triacrylate | 15 |
| Acrylonitrile | 5 |
| B-Hydroxyethyl Acrylate | 10 |
| 2, 5-Acetophenone | 2.5 |

The methacrylated polyester was prepared from polyester consisting of 2 moles of 1, 6-hexanediol, 2 moles of adipic acid and 1 mole of isophthalic acid reacted with 2 moles of glycidyl methacrylate. Phenothiazine (0.05 g) and nitrobenzene (0.025 g) were added to the glycidyl methacrylate monomers to inhibit premature polymerization. The glycidyl methacrylate was added over a one hour period controlling the exotherm to 100° C. Upon completion of the addition, the reactants were held at 100° C. to 105° C. until an acid number of 18 was obtained.

Curing of 1.0 mil was accomplished upon exposure to 2-200 watt/inch medium pressure mercury lamps for 4 seconds under a nitrogen blanket.

EXAMPLE IV

| | |
|---|---|
| Acrylated Epoxy Resin (Shell Chemical DRH-302 Bisphenol A-epichlorohydrin Resin) | 30 |
| Neopentyl Glycol Diacrylate | 45 |
| 2-Ethylhexyl Acrylate | 35 |
| Benzyldisulfide | 3.5 |

The acrylated epoxy resin was a conventional epoxypolymer which was further reacted with acrylic acid to impart acrylic type terminal unsaturation to the polymer.

2.0 mils was cured in a nitrogen atmosphere upon exposure to 2-200 watt/inch medium pressure mercury lamps.

EXAMPLE V—Air Cured Coating:

epoxidized soybean oil had an average of 2.2 acrylyl groups.

1.0 mil films were cured in air upon exposure to 2.2 kilowatts medium pressure mercury lamps.

EXAMPLE VI

| | |
|---|---|
| Acrylated Amine | 90 |
| N-Vinylpyrrolidone | 20 |
| Benzophenone | 3.0 |

The acrylated amine was prepared from a mixture of 53.5 grams diethylene glycol diacrylate and 8.6 grams of piperazine in 22 ml. of anhydrous methanol at 20° C. for one hour. After one hour, the methanol was stripped leaving a colorless liquid acrylated amine. Curing took place upon three second exposure under a 550 watt medium pressure mercury arc in a nitrogen atmosphere.

It will be appreciated that the examples herein presented of ethylenically unsaturated polymer materials for ultra-violet curing which meet the necessary prerequisites for coatings covered under this invention are given for illustrative purposes only. Other polymeric coating constituents capable of meeting the necessary prerequisites are also applicable.

For example, U.S. Pat. No. 3,699,084 describes a polyene having a molecule containing at least two unsaturated carbon to carbon bonds disposed at terminal positions on a main chain backbone of the molecule and a polythiol component having a molecule containing a multiplicity of pendant or terminally positioned —SH functional groups per average molecule and capable of curing in the presence of chemical free radical generation such as:

90 PARTS

POLYESTER-URETHANE DIENE
10 PARTS

PENTAERYTHRITOL TETRAKIS (THIOGLYCOLATE)
1 PART

PHOTOINITATOR

| | |
|---|---|
| Urethane Adduct | 30 |
| Acrylated Epoxidized Soyabean Oil | 20 |
| (Methylcarbamyl) Ethyl Acrylate | 40 |
| Neopentyl Glycol Diacrylate | 10 |
| 2-Chlorothioxanthone | 2 |
| Methyldiethanolamine | 3 |

The urethane adduct was prepared by reacting at 40° to 45° C. 1.0 mole of trimethylhexamethylene diisocyanate dissolved in 0.1 mole of 2-phenoxyethyl acrylate with 2 moles of 2-hydroxyethyl acrylate. The acrylated U.S. Patent No. 3,509,234, to Burlant describes radiation curable coatings comprising vinyl monomers and a resin formed by first reacting a hydroxylated polymer consisting essentially of carbon, hydrogen and oxygen with one —NCO group from diisocyanate monomers to provide an isocyanate terminated polymer and subsequently reacting the remaining —NCO group from said diisocyanate monomers with a hydroxy alkylacrylate or hydroxy alkyl methacrylate monomer, thereby introducing into said resin, alphabeta olefinic unsaturated groups each of which are separated from the principal carbon to carbon chain of said resin by two urethane groups such as:

It is also known in the art, as set forth in U.S. Pat. No. 3,923,523, that a photo-curable composition can be obtained from a polyol having a photo-polymerizable alpha, beta-unsaturated ester group and a polycarboxylic acid anhydride such as pyromellitic acid anhydride along with a photo-polymerization initiator and optionally, a photopolymerizable monomer such as: (0.1 mole) of the reaction product of neopentyl glycol diglycidyl ether and acrylic acid (molar ratio ½) was dissolved in 70 g of N-vinyl pyrrolidone and (0.1 mole) of pyromellitic acid dianhydride was added to the solution with agitation. Then the mixture was reacted at room temperature for 24 hours. A polyester solution having a viscosity of 13,200 poise at 25° C. was obtained.

The photo-curable composition was prepared by adding 37.8 parts (by weight of the composition) of trimethylolpropane triacrylate, 2 parts of benzoin-methyl ether to 60 parts of the obtained polyester solution. The composition was cured to a 1.0 mil film upon exposure to a 500 watt high pressure mercury lamp at a distance of 30 cm requiring 0.3 seconds.

The present invention, it should be noted does not reside in any particular class of actinic radiation cured coatings. It will be appreciated, by those skilled in the art, that not all photo-curable coatings are suitable for the prerequisite characteristics set forth in this invention. For example, there are coating compositions that degrade quickly, and take a prolonged residence time and, would not be consistent with the process. Other coatings would be too brittle and have poor adhesion to the flexible substrate, would have poor stain resistance, poor gloss retention and wear properties and the like.

Coatings suitable for purposes of this invention will have the necessary physical properties to display excellent stain resistance, flexibility, adhesion, gloss retention and wear properties.

Decorative designs printed on the surface of resinous sheet compositions are generally protected with a clear transparent coating which is generally set or cured in heating ovens. It has recently become known in the art to use coatings which are curable by exposure to actinic radiation such as ultraviolet light as shown in U.S. Pat. No. 4,100,318.

The novel idea of this invention is to create a crinkle finish in register with a decorative pattern on a flexible sheet goods substrate. The emboss is formed by an actinic radiation curable coating which serves to give the pattern the desired raised relief effects and also serves as the protective topcoat with superior stain, gloss and wear properties.

A wide variety of shapes and designs can be achieved on a flexible sheet goods by implementation of this invention. For instance, in a copending application Ser. No. 862,641 filed Dec. 20, 1977 entitled Crinkle Emboss and Method, there are many methods cited for achieving embossed design variations.

In the above mentioned copending application it is taught that the wider the variation in physical properties between the actinic radiation curable coating and the flexible substrate, the larger the crinkle. It is also described how varying the thickness of the actinic radiation curable coating over a given flexible substrate permits uniform crinkle emboss variations to be achieved. Generally, the heavier the actinic radiation curable coating, the larger more dispersed the crinkle size. It was found that by varying the thickness of the vinyl substrate maintaining a given actinic radiation curable coating, that crinkle emboss variations can also be achieved. It was also found that temperature had an effect on crinkle size.

A practical application of the present invention is to create a crinkle finish in register over a flexible sheet goods product which comprises the steps of coating an asbestos felt substrate 35 mils thick with a flexible foamable vinyl plastisol 14 mils thick, heating to gel the foamable composition in a forced air oven at 275° F., after which, a multicolored decorative pattern is applied to the surface of the gelled coating. The thus printed vinyl gel is then coated with a clear vinyl overlay, 14 mils thick, and gelled in an infrared oven.

| Foam Formulation | | Transparent Overlay Formulation | |
|---|---|---|---|
| Ingredients | Parts | Ingredients | Parts |
| Polyvinyl Chloride (dispersion grade Inherent viscosity 0.81) | 70 | Polyvinyl Chloride (dispersion grade Inherent viscosity 1.40) | 65 |
| Polyvinyl Chloride (large size blending resin) | 30 | Polyvinyl Chloride (dispersion grade Inherent viscosity 1.50) | 35 |
| Modified Alkyl (iso C7–C9) Aryl Phthalate Di(2-Ethylhexyl) Phthalate | 50 9 | Modified Alkyl (iso C7–C9) Aryl Phthalate 2,2,4 Trimethyl-1,3-pentanediol diisobutyrate | 35 7.5 |
| Titanium Dioxide (60% dispersion in DOP) | 10 | V.M.&P. Naphtha (boiling range 190°–275° F.) | 2.5 |
| Azodicarbonamide (50% dispersion in DOP) | 5.5 | 2,hydroxy 4, octyloxy benzophenone | 0.5 |
| Cadmium/Zinc Octoates | 1.5 | | |
| V.M.&P. Naphtha (Boiling Range 190°–275° F.) | 5.0 | | |
| Polyethylene Glycol Monolaurate (400 Mol. Wgt) | 1.0 | | |

Physical Properties of Flexible Vinyl Substrate

| | |
|---|---|
| Tensile Strength, psi | 2,750 |
| 100% Modulus, psi | 1,850 |
| Elongation, % | 220 |

The flexible substrate is then passed through a two station rotary screen printing unit where a low gloss actinic radiation curable coating is printed in register with the previously rotogravure printed grout and a high gloss actinic radiation curable coating is printed over the previously rotogravure printed tile.

The first rotary screen was engraved to laydown 1 mil of coating. The second rotary screen was engraved at varying depths across the tile to laydown from 0.5 mils to 5 mils.

The high gloss radiation curable coating is made up of the following:

| Ingredients | Parts |
|---|---|
| Acrylourethane Oligomer | 70 |
| 2-ethylhexyl acrylate | 30 |
| Hexanedioldiacrylate | 4 |
| Benzoin Butyl Ester | 1 |

The medium molecular weight isocyanate terminated urethane oligomer was prepared in 2-ethylhexylacrylate monomer. A stoichiometric amount of hydroxyethyl acrylate was added to accomplish the acrylate capping.

Physical Properties of the Ultraviolet Curable Coating

| | |
|---|---|
| Tensile Strength, psi | 2,900 |
| 100% Modulus | 61,000 |
| Elongation, % | 26 |

The low gloss coating is the same as the high gloss coating with the addition of 3 parts of fumed silica (Cab-O-Sil) produced by Cabot Company for flatting purposes.

The actinic radiation curable coatings are fully cured on exposure to a bank of medium pressure mercury lamps operating in the 1800 A to 4000 A wavelength range providing 750 watts per linear inch to ultraviolet radiation. Distance from lamps is 3 inches and line speed is 60 feet/minute.

Figure 2:
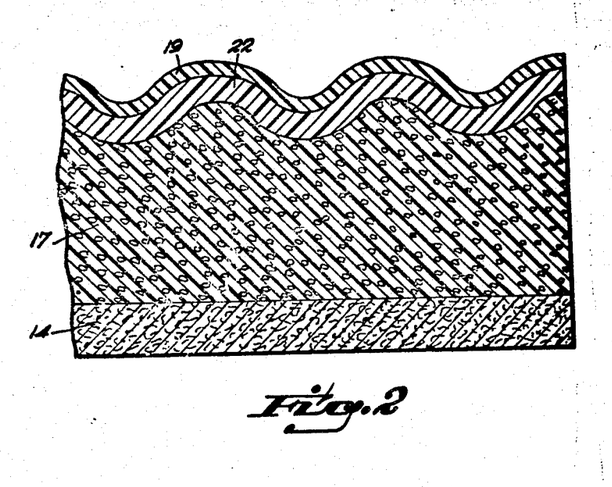
FIG. 2 shows a side view of the product.
Figure 3:
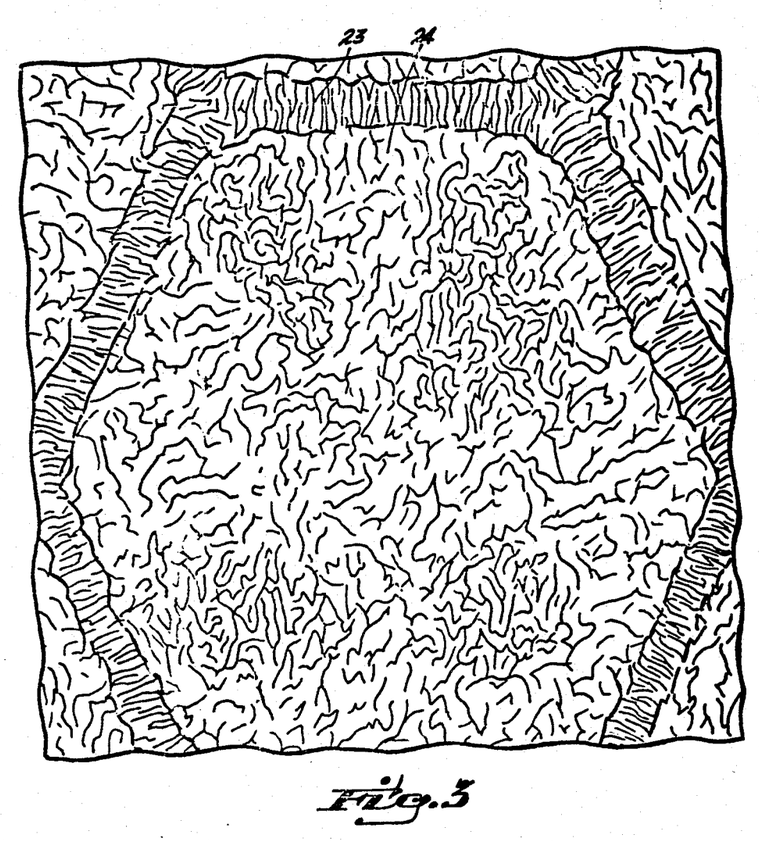
FIG. 3 shows a form of top appearance.

The substrate is then passed through a high temperature oven (350° to 450° F.) to fuse the clear vinyl overlay and expand the foamable composition while also developing a surface emboss with varying crinkle sizes and shapes. As illustrated in FIG. 3, the grout 23 with the 1 mil laydown of coating exhibits a certain size crinkle while the high gloss coating on the tile portion 24 exhibits varying shapes from small to large size crinkle emboss conforming to the amounts of coating applied. As shown in FIG. 2, a felt substrate 14 has the cellular foam 17 applied to it. A vinyl overlay 22 is applied to the cellular foam 7 and the actinic radiation cured coating 19 is the outer coat which, as shown in FIG. 3, has a varied crinkle exhibiting superior gloss, stain resistance, and wear properties.

The actinic radiation coated embossed substrate is then cooled and rolled for shipment.

Viscosities for the ultraviolet curable coatings are dependent on the engraving; however, viscosities are generally in the range of 3,000 to 25,000 cps at ambient temperatures. Much higher viscosity coatings may be used; however, very low viscosity coatings are generally avoided.

An appropriate gas sweep is employed, that is, if the actinic radiation curable coating is one that requires a non-oxidizing environment nitrogen gas sweep is used. If the actinic radiation curable coating can be cured in air, an air sweep is used.

The volume of gas maintained across the sheet substrate will depend mainly on the line speed and the opening gap between the sheet substrate and the lamps.

If a high enough flow of nitrogen is not maintained to exclude oxygen, there can be some oxygen inhibition of surface cure which can result in a tacky surface with poor physical property development of the coating.

Whether the actinic radiation curable coating be an inert or an air cure system, sufficient gas sweep (Nitrogen or Air) is necessary because at operating temperatures of 150° F.-250° F. there can be some volatilization of the reactive monomers in the ultraviolet lamping oven which must be removed; otherwise, they will deposit on the lamps and reflectors and degrade. The resulting deposition and degradation of reactive monomers leads to loss of efficiency of the ultraviolet lamps and can lead to incomplete cure. The gas sweep should be such that it, in effect, sets up a laminar flow holding monomer fumes on the moving web and exhausts said fumes out of the exit of the ultraviolet lamping oven.

The amount of ultraviolet lamps and lamp intensity is governed by line speed, coating chemistry and thickness of coating.

The actinic radiation crinkle finish product exhibits excellent stain resistance, gloss retention and wear properties.

Gloss retention is the ability of a surface to retain its specular reflectance (gloss) values for a satisfactory service life while in use as a finished flooring surface. Laboratory methods which have been found helpful for comparison of flooring surfaces for gloss retention utilizes scrubbability testers. A flooring substrate is exposed to 125, 250 and 500 cycles on the scrub machine with 10 mils of a scrub solution. The degree of gloss loss is recorded as the number of cycles necessary to give initial visual gloss loss. The percent of gloss loss is recorded as the ratio difference between the initial and final gloss to the initial gloss.

Gloss retention testing of the coated cushioned sheet vinyl product gave results on the order of 2 times less gloss loss compared to the conventional cushioned sheet vinyl product.

Abrasion resistance is commonly determined by the mils of surface thickness lost per 1,000 cycles of a surface abrader. Tests carried out with a taber abrader 5,000 cycles, CS-17 wheel, 1000 gm load suction 60 showed abrasion resistance of the coated substrate to be on the order of 2.25 times less abrasion loss per given abrasion test cycles compared to the conventional cushioned vinyl substrate.

Stain resistance of a flooring substrate is a measure of its resistance to the migration of materials placed in contact with the floor which can result in permanent staining. Normal household materials which can come in contact with the flooring and result in a stain are such things as iodine, merthiolate, mercurochrome, mustard, lipstick, shoe polish and ink.

Testing for stain resistance is usually carried out by applying a ⅛ to ¼ inch spot of stain. After six hours, the stains are wiped off. Stains are rated visually.

The actinic radiation emboss coated product was a marked improvement in every stain test for the above recited stains over the conventional cushioned vinyl sheet substrate.

While a process and the product of the process have been described wherein an actinic radiation curable coating is printed on an essentially smooth flexible vinyl surface with a resulting texturing after curing and exposure at elevated temperatures, this invention is not intended to be limited to such embodiments. On the contrary, it has been found, for instance, that printing an actinic radiation coating in register over a previously embossed flexible vinyl sheet that further desirable effects can be achieved. For example, where there are areas which are foamed to varying heights and other areas which are relatively non-cellular, as a result of chemical inhibition of the blowing agent in selected areas, or by mechanically crushing the foam in selected areas, or even by rotary screen printing of foamable plastisols in selected areas, exposure to elevated temperature (200°-250° F.) produce novel and unexpected shapes and designs which could not otherwise be achieved. In the areas of the sheet where there is relatively little or no foaming the elongation properties are such that a fine crinkle emboss texture takes place and in the areas where there is considerable foaming and higher elongation a larger more dispersed crinkle takes form.

Another method of practicing this invention is to print and cure the actinic radiation curable emboss coating on the fused and expanded sheet at lower temperatures in the range of 100° F. to 180° F. so as not to produce the crinkle effect. The product thus produced, while lacking crinkle finish, exhibits optical variations conforming to the engraving.

A further method of practicing this invention is to print the actinic radiation curable coating and utilize the vinyl overlay as the topcoat. However, it is more practical to utilize the actinic radiation cured coating as the topcoat because of its superior gloss and wear properties.

A further method of practicing the invention is through pigmenting the actinic radiation curable coating to give further 3-dimensional effects to the decorative product.

In view of the foregoing, it becomes apparent that the physical properties achieved in the embossed sheet goods are essentially within the following ranges, and within those ranges, superior gloss, wear, and stain resistance properties are exhibited in addition to the attractive embossing. The ranges of the physical properties of the coating are set forth as follows:

| Tensile Strength | 2,000–4,000 PSI |
| Percentage Elongation | Greater than 15% |
| Young's Modulus | 30,000–90,000 |

Ranges of the relative durability properties such as gloss retention, abrasion, resistance, and stain resistance are:

| Property | Uncoated Sheet Goods | Coated Sheet Goods |
| --- | --- | --- |
| Gloss Loss | 250 cycles | 500 cycles or more |
| Abrasion Resistance (CS-17 Wheel, 1000gm load suction 60, equal weight loss) | 1000 | 2250 or more |
| Stain Resistance (6 hour contact time) | | |
| Ink | Poor | Good to Excellent |
| Mustard | Poor to Good | Good to Excellent |
| Lipstick | Poor to Good | Excellent |
| Shoe Polish | Poor | Good To Excellent |
| Mercurochrome | Poor to Good | Good to Excellent |
| Merthiolate | Poor to Good | Good to Excellent |
| Iodine | Poor to Good | Good To Excellent |

The flexible substrate may be cellular or noncellular. The actinic radiation coating may be printed and cured on a flexible cellular substrate before or after final fusion and expansion of the substrate. The actinic radiation coating may be printed and cured on a flexible non-cellular substrate before or after final fusion of the substrate.

Although particular embodiments of the invention have been shown and described in full here, there is no intention to thereby limit the invention to the details of such embodiments. On the contrary, the intention is to cover all modifications, alternatives, embodiments, usages and equivalents of the invention as fall within the spirit and scope of the invention, specification and the appended claims.

What is claimed is:

1. The process for providing a crinkle finish on a decorative pattern on a flexible substrate comprising the steps of:
    coating said substrate with a foamable vinyl composition and heating to gel the foamable composition,
    applying a decorative pattern to the surface of the gelled composition,
    coating a vinyl overlay over the decorative pattern,
    heating to gel the vinyl overlay,
    passing the flexible coated substrate through a printer where an actinic radiation curable coating of lower elongation properties than that of the vinyl overlay is applied at varying thicknesses in preselected areas of the substrate in register with the decorative pattern,
    curing said coating upon exposure to actinic radiation,
    passing the flexible coated substrate through a fusion and expansion oven, whereby upon exiting, the foamable coat has expanded to a cellular foam, the vinyl overlay is fused, and the product exhibits a crinkled surface texture which has been created on the surface of the flexible substrate by permitting the differential elongation properties of the overlay and the printed actinic radiation cured coatings to interact to give the crinkle surface texture.

2. The process of claim 1, wherein the foamable vinyl composition contains polyvinyl chloride resins, plasticizers, blowing agent, pigment and activators proportioned to provide a blowing capability of at least 200%.

3. In the process of claim 1,
    applying a thinner layer of said curable coating to grout simulated printed patterns and, applying a thicker layer of said curable coating to tile simulated printed areas.

4. The product of the process of claim 1.

5. A flexible sheet good having a crinkle finish and emboss surface in register with a decorative pattern comprising, in combination,
- a foamable vinyl composition applied atop a substrate which has been heated to gel the foamable composition,
- a decorative pattern applied to the surface of the gelled composition,
- a vinyl overlay applied atop the decorative pattern, said vinyl overlay being gelled,
- said gelled overlay having a printed actinic radiation cured coating of lower elongation properties than that of the vinyl overlay,
- said actinic radiation curable coating being applied at varying thicknesses in preselected areas of the substrate in register with the decorative pattern,
- said actinic radiation curable coating being cured by exposure to actinic radiation,
- said flexible coated substrate being fused whereby the foamable coat expands to a cellular foam, the vinyl overlay has been fused, and the product exhibits a crinkled surface texture which has been created on the surface of the flexible substrate by permitting the differential elongation properties of the overlay and the printed actinic radiation cured coating interact to give the crinkled surface texture.

6. The product of claim 5, wherein
a carrier of felt like material is provided for the flexible substrate.

* * * * *